US007839426B2

(12) United States Patent
Ebara

(10) Patent No.: US 7,839,426 B2
(45) Date of Patent: Nov. 23, 2010

(54) TIME RECORDER

(75) Inventor: Koji Ebara, Chiba (JP)

(73) Assignee: Seiko Precision Inc., Narashino-shi (JP)

( * ) Notice: Subject to any disclaimer, the term of this patent is extended or adjusted under 35 U.S.C. 154(b) by 0 days.

(21) Appl. No.: 12/341,100

(22) Filed: Dec. 22, 2008

(65) Prior Publication Data

US 2009/0109249 A1 Apr. 30, 2009

Related U.S. Application Data

(63) Continuation of application No. PCT/JP2007/062483, filed on Jun. 21, 2007.

(30) Foreign Application Priority Data

Jun. 27, 2006 (JP) ............................ 2006-176791
Aug. 29, 2006 (JP) ............................ 2006-232286

(51) Int. Cl.
*B41J 2/32* (2006.01)
*B41J 2/235* (2006.01)
*B41J 32/00* (2006.01)
*G01D 15/20* (2006.01)

(52) U.S. Cl. ....................... 347/171; 347/172; 347/211; 347/214; 347/197; 346/80

(58) Field of Classification Search ....................... None
See application file for complete search history.

(56) References Cited

U.S. PATENT DOCUMENTS 4,697,942 A * 10/1987 Yagi et al. .................. 400/208
4,911,566 A * 3/1990 Imaseki et al. ......... 400/120.16

FOREIGN PATENT DOCUMENTS

JP 7-29470 4/1995
JP 7-220128 8/1995
JP 2000-88615 3/2000
JP 2004-223241 A1 8/2004

OTHER PUBLICATIONS

International Search Report for International Application No. PCT/JP2007/062483 dated Jul. 31, 2007.
Taiwan Office Action dated May 27, 2010, along with its English Translation.
Chinese Office Action dated Jul. 28, 2010, with English Translation.

* cited by examiner

*Primary Examiner*—Omar Rojas
(74) *Attorney, Agent, or Firm*—Kratz, Quintos & Hanson, LLP

(57) ABSTRACT

A time recorder includes a print head, a ribbon cassette swingably supported and having an ink ribbon applied with a different colors in a width direction, and a cam for swinging the ribbon cassette to change a position of the ink ribbon against the print head in the width direction of the ink ribbon and to change a color to be printed on time card, further comprising a first stopper and a second stopper for limiting a rotational range of the cam.

5 Claims, 13 Drawing Sheets

TIME RECORDER

CROSS-REFERENCE TO RELATED APPLICATION

This application is a continuation of and claims priority to International Patent Application No. PCT/JP2007/062483 filed on Jun. 21, 2007, which claims priority to Japanese Patent Application No. 2006-176791 filed on Jun. 27, 2006 and Japanese Patent Application No. 2006-2322686 filed on Aug. 29, 2006, subject matter of these patent documents is incorporated by reference herein in its entirety.

BACKGROUND OF THE INVENTION

1. Field of the Invention

This invention relates to time recorders for printing the current time on a time card.

2. Description of the Related Art

Conventionally, there has been known a time recorder printing the current time on a predetermined print zone of a time card. Such a time recorder has a structure that can change the positional relation between an ink ribbon and a print head by moving a ribbon cassette upwardly and downwardly, and that can change the color to be printed on the time card (see Japanese Examined Patent Publication No. 7-29470). Specifically, such a structure is provided with a cam rotated by a rotation of a motor, and the function of this cam allows the ribbon cassette to be swung upwardly and downwardly.

Furthermore, in order to control a position of the ink ribbon against the print head, mounting a sensor to the cam detects the amount of the rotation of the cam, or the number of pulses applied to the motor is counted, thus controlling the position of the ribbon cassette.

However, in the method of controlling a stop position of the ribbon cassette by causing the sensor to detect the amount of the rotation of the cam or by counting the number of pulses applied to the motor, there arises a problem in that the time recorder will be structurally complicated and the manufacturing cost will be increased.

SUMMARY OF THE INVENTION

It is therefore an object of the present invention to provide a time recorder capable of maintaining the accuracy of changing the color to be printed with a simplified structure.

According to an aspect of the present invention, there is provided a time recorder including: a print head; a ribbon cassette swingably supported and having an ink ribbon applied with a different colors in a width direction; a cam for swinging the ribbon cassette to change a position of the ink ribbon against the print head in the width direction of the ink ribbon and to change a color to be printed on time card; a stopper for limiting a rotational range of the cam; a DC motor for rotating the cam; and a drive circuit for intermittently driving the DC motor by alternately switching a energized state and a short-circuit state, and for braking the DC motor by bringing the DC motor to a short-circuit state during a predetermined period, wherein the drive circuit permits the DC motor to rotate in a direction by alternately switching an intermittent driving state and a braking state.

With this arrangement, the rotational range of the cam can be limited by a simple structure, making it possible to limit the swinging range of the ribbon cassette. It is therefore possible to maintain the accuracy of changing the color to be printed by the changing positional relation between the print head and the ink ribbon with a simple structure.

Also, even if the rotational range of the cam is roughly set, the rotational range thereof is limited with certainty.

Thus, the swinging range of the ribbon cassette can be limited with certainty, enabling the accuracy of changing the color to be printed to be maintained.

Moreover, with the simple structure, it is possible to maintain the accuracy of changing the color to be printed, so that the manufacturing cost can be reduced.

Additionally, with this arrangement, the DC motor is driven intermittently by alternately changing the energized state and the short-circuit state, it is therefore possible to rotate the DC motor slowly with a constant torque ensured.

The DC motor can be rotated slowly, it is therefore possible to cushion the impact that is generated by the abutment of the cam with the stopper due to the rough setting of the rotational range of the DC motor.

Also, the DC motor is provided in the short-circuit state to be stopped, it is possible to further cushion the impact generated by the abutment of the stopper with the cam.

In addition, with this arrangement, even if the cam abuts with the stopper during the intermittent driving period and the cam rotates in the reverse direction, the reverse rotation of the cam is restrained by the subsequent braking state.

Therefore, it is possible to restrain the reverse rotation of the cam.

Also, when the state is changed to the intermittent driving state again after the braking state, the DC motor starts rotating from the position again. Therefore, even if the cam comes into contact with the stopper to rotate the cam 64 in the reverse direction, it is possible to finally stop the cam in a suitable position.

Therefore, even if the rotational range of the cam is roughly set, it is possible to maintain the accuracy of the changing the color to be printed.

BRIEF DESCRIPTION OF THE DRAWINGS

Preferred embodiments of the present invention will be described in detail with reference to the following drawings, wherein.

DESCRIPTION OF THE PREFERRED EMBODIMENTS

An embodiment according to the present invention will now be described, with reference to the accompanying drawings.

First Embodiment

Figure 1:
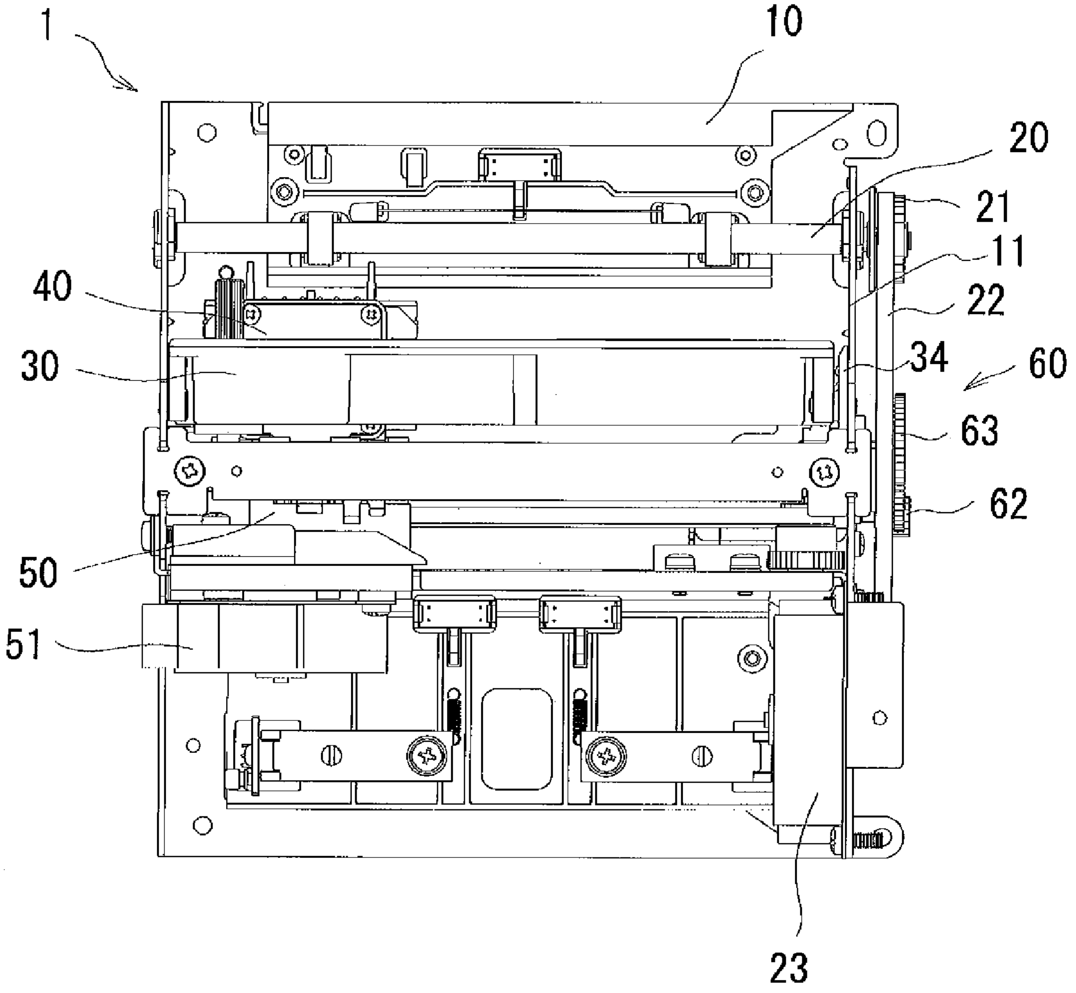
FIG. 1 is a front view showing an internal structure of a time recorder.
Figure 2:
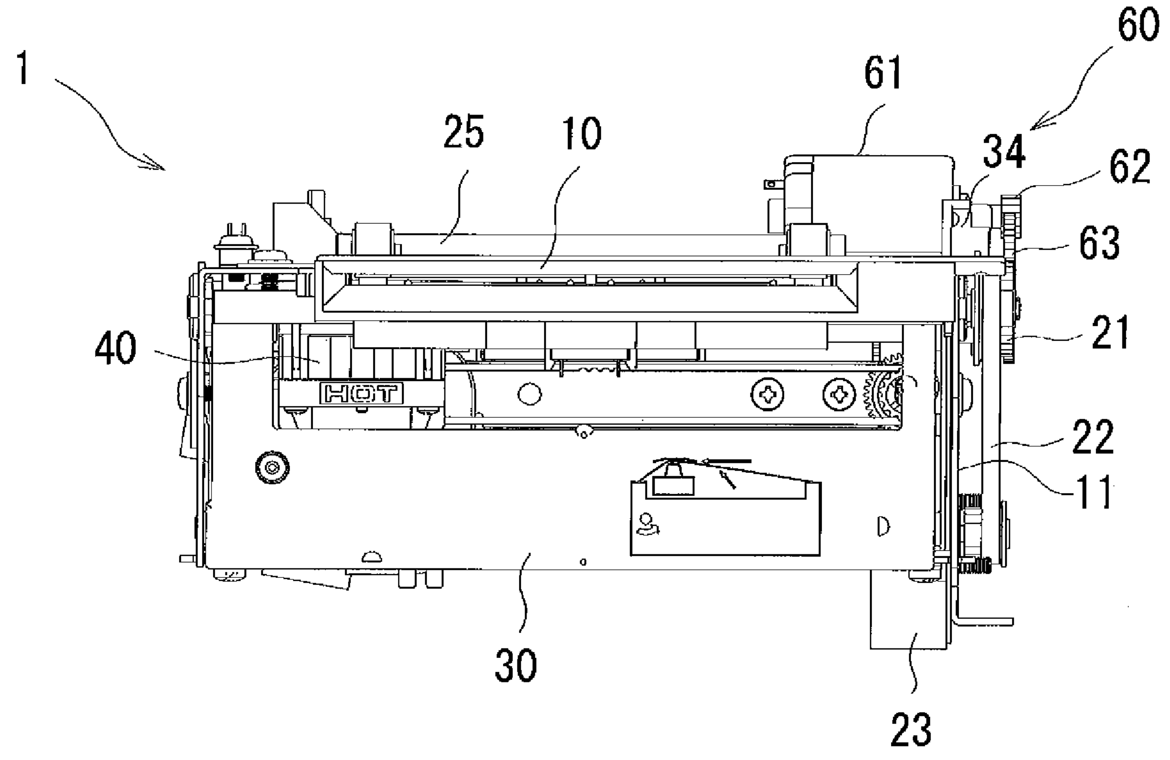
FIG. 2 is a top view showing an internal structure of the time recorder.
Figure 3:
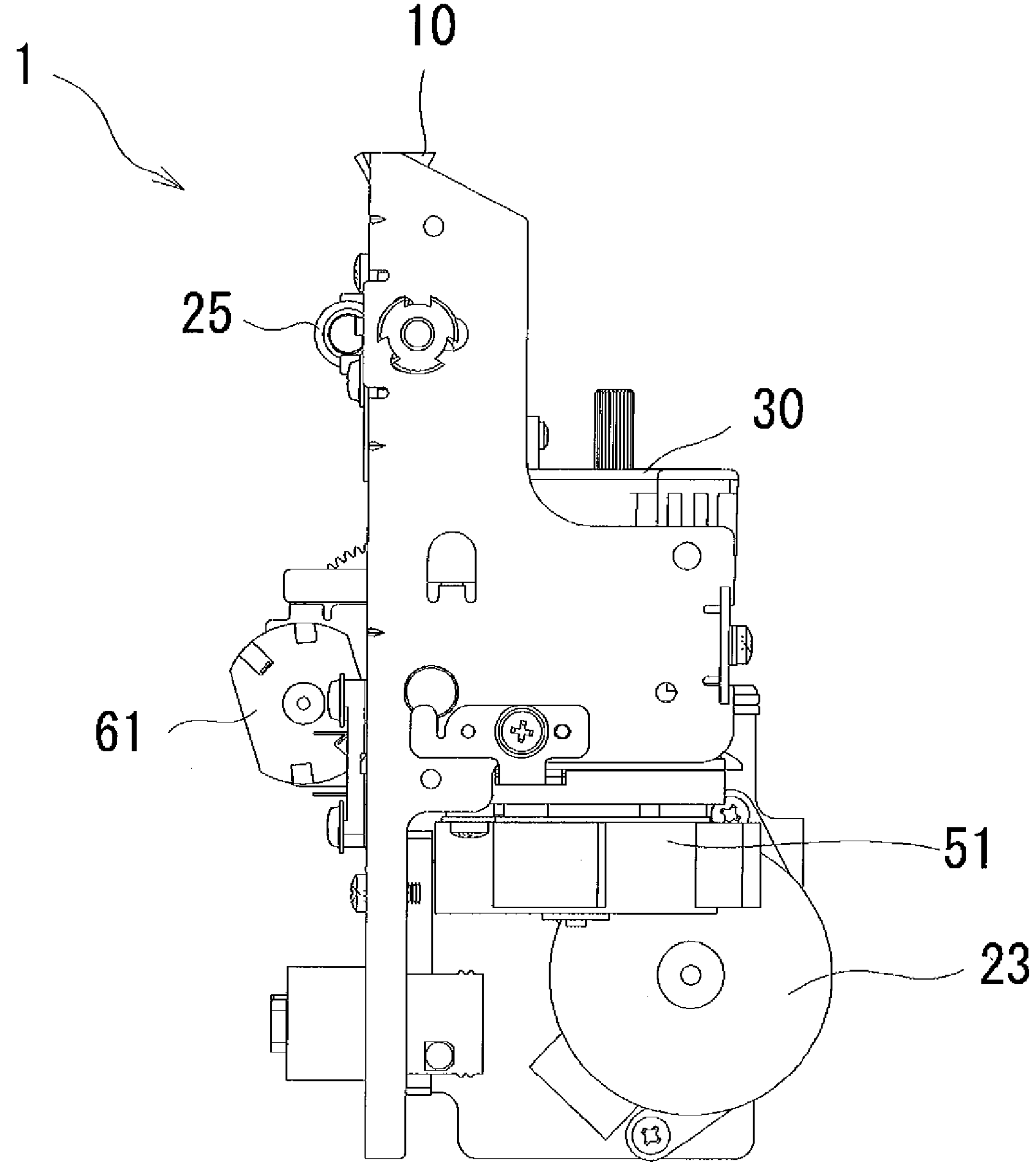
FIG. 3 is a left side view showing an internal structure of the time recorder.
Figure 4:
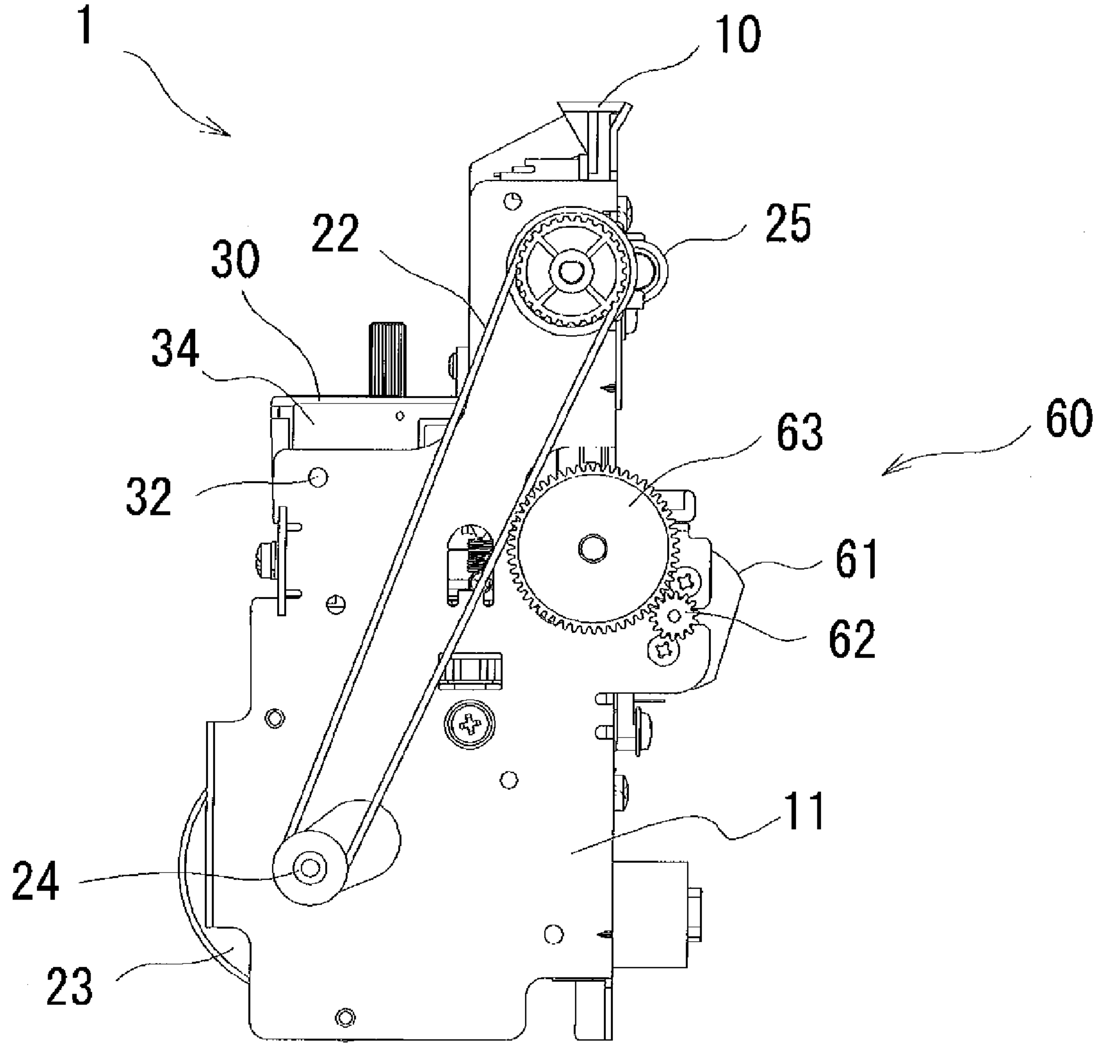
FIG. 4 is a right side view showing an internal structure of the time recorder.
Figure 5:
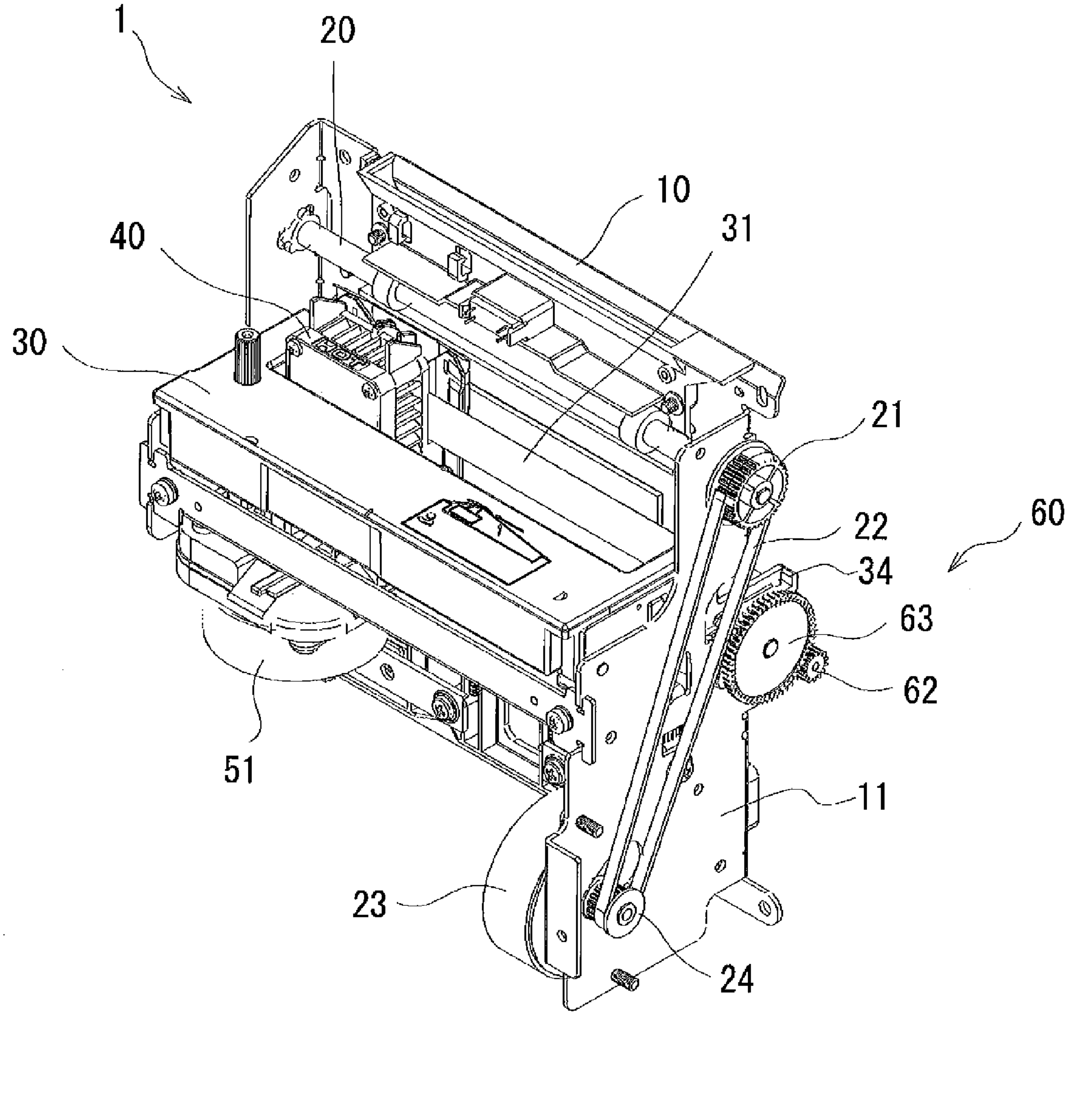
FIG. 5 is a perspective view showing an internal structure of the time recorder.

FIGS. 1 to 5 show the internal structure of a time recorder 1, FIG. 1 is a front view of the time recorder 1, FIG. 2 is a top view thereof, FIG. 3 is a left side view thereof, FIG. 4 is a right side view thereof, and FIG. 5 is a perspective view thereof.

The time recorder 1 includes a ribbon cassette 30, a print head 40, a carriage 50, and a carriage motor 51.

The ribbon cassette 30 is swingably supported about a predetermined shaft described later.

Also, the ribbon cassette 30 has an ink ribbon 31. The ink ribbon 31 has the different two colors of black and red in a belt-like shape in the width direction.

The print head 40 is movably supported in a lateral direction by the carriage 50. Additionally, the carriage 50 reciprocates in the lateral direction by the rotational drive of the carriage motor 51 mounted thereblow.

Also, when a time card is inserted into a time card insertion slot 10 which is located at an upper portion of the time recorder 1, the time card is guided to a predetermined position by a feed roller 20 and a driven roller 25, enabling the clock time to be printed on the time card with a predetermined color by the print head 40. For example, in the state shown in FIG. 5, the clock time is printed in black on the time card. Additionally, as to the feed roller 20, the rotational drive is transmitted from a feeding motor 23 through an endless belt 22 which is attached to both gears 21 and 24, the gear 21 being attached to one end of the feed roller 20, the gear 24 being attached to the feeding motor 23.

Figure 6:
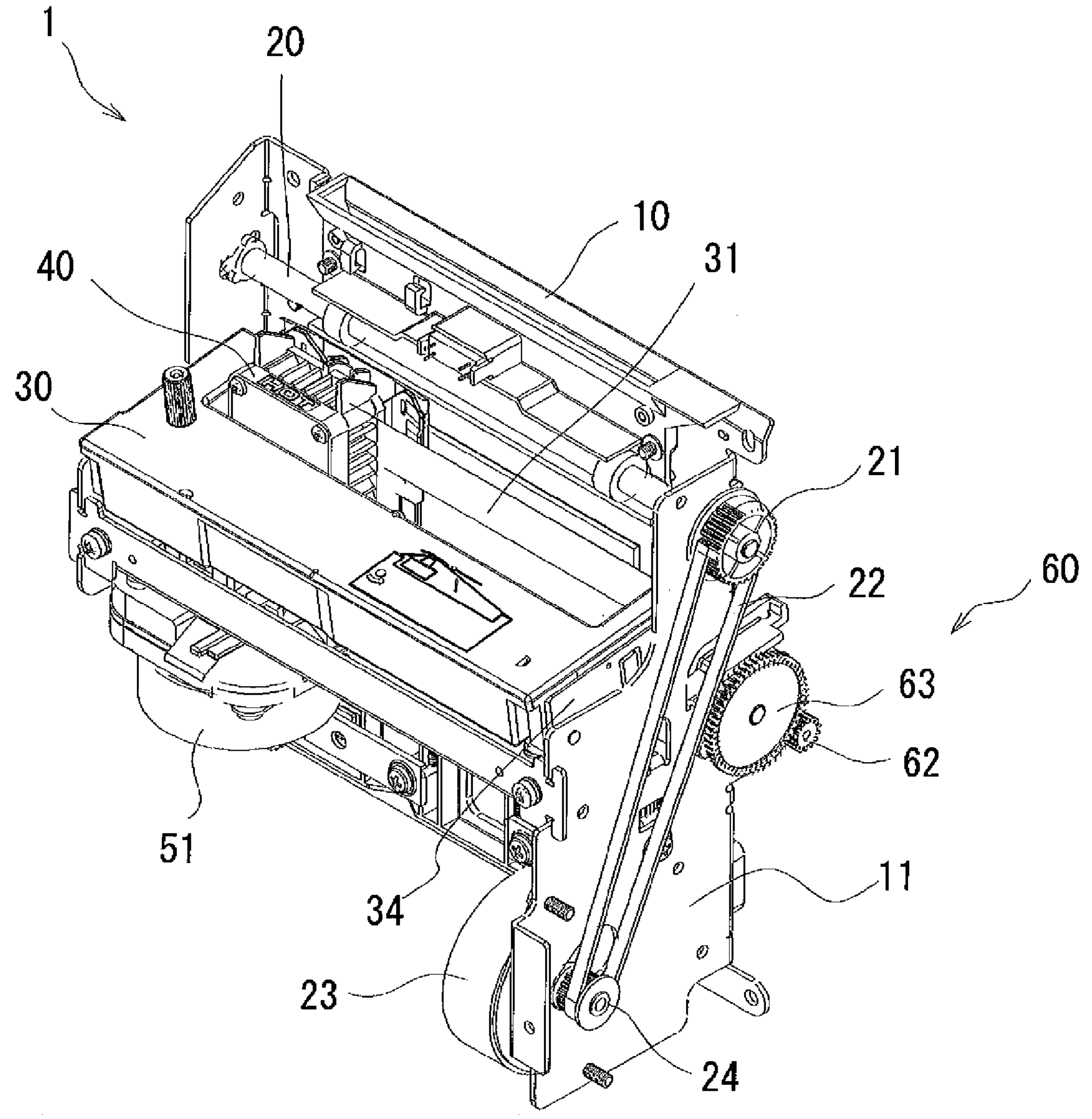
FIG. 6 is a perspective view showing the time recorder in the state in which a ribbon cassette is inclined.

FIG. 6 is a perspective view showing a time recorder 1 in the state in which the ribbon cassette 30 is inclined. The positional relation between the print head 40 and the ink ribbon 31 is changed by inclining the ribbon cassette 30. When the time card is inserted in this state, the current time is printed in red on the time card.

Therefore, the color to be printed on the time card is changed.

Figure 7:
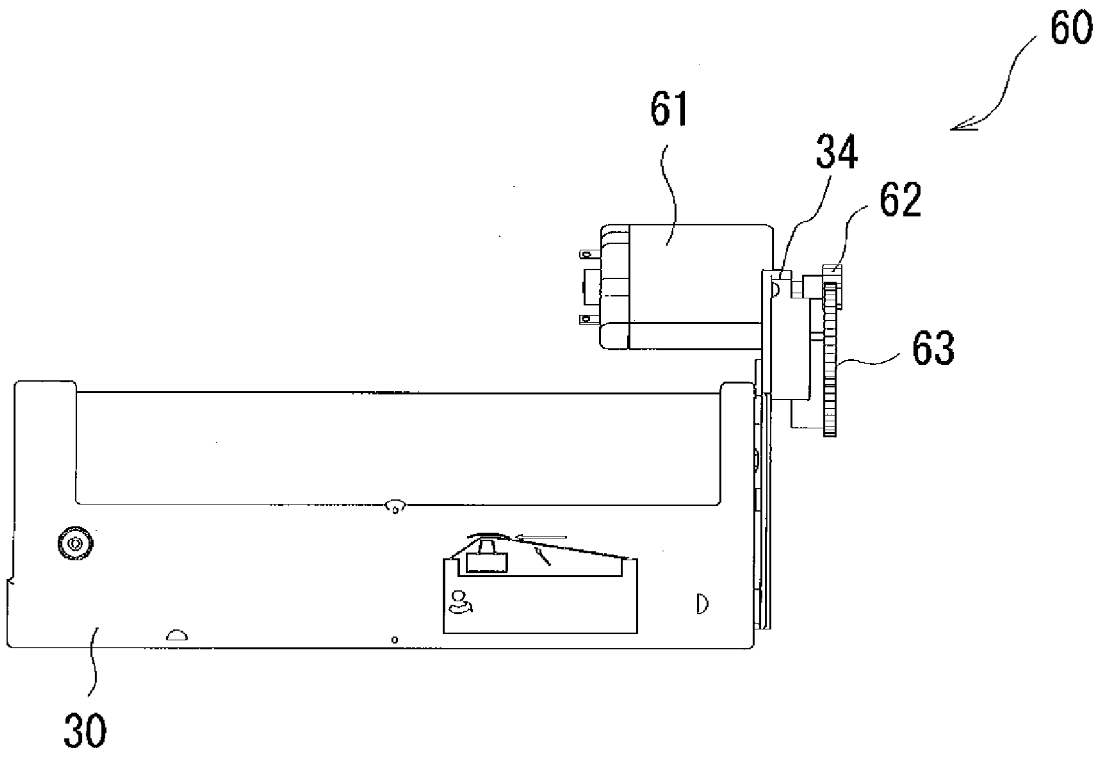
FIG. 7 is a top view showing structures of the ribbon cassette 30 and a swing mechanism.
Figure 8A:
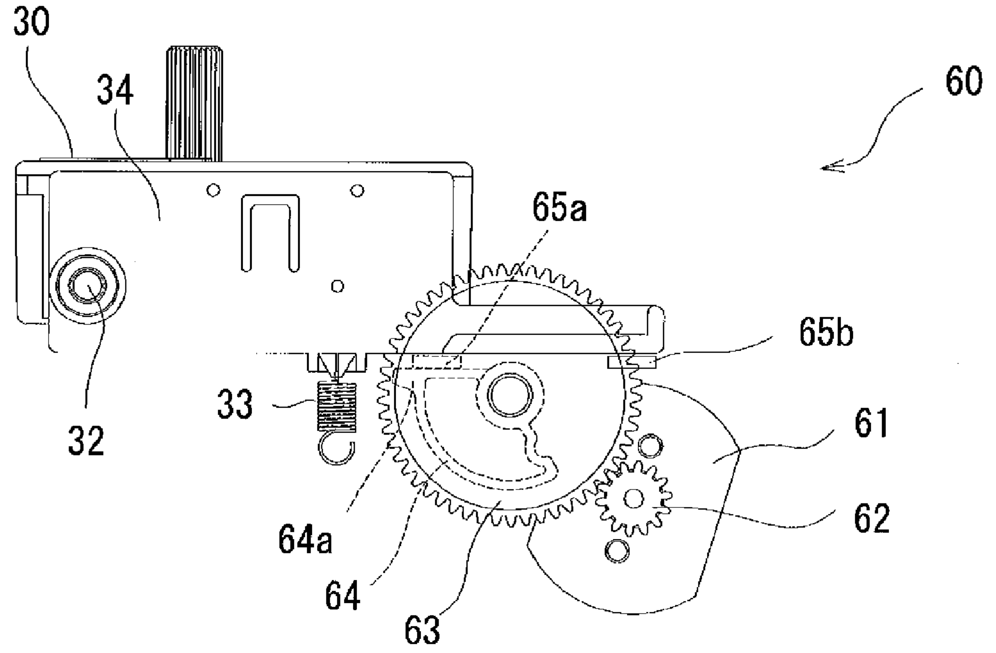
FIGS. 8A and 8B are a side views showing the ribbon cassette and the swing mechanism.
Figure 8B:
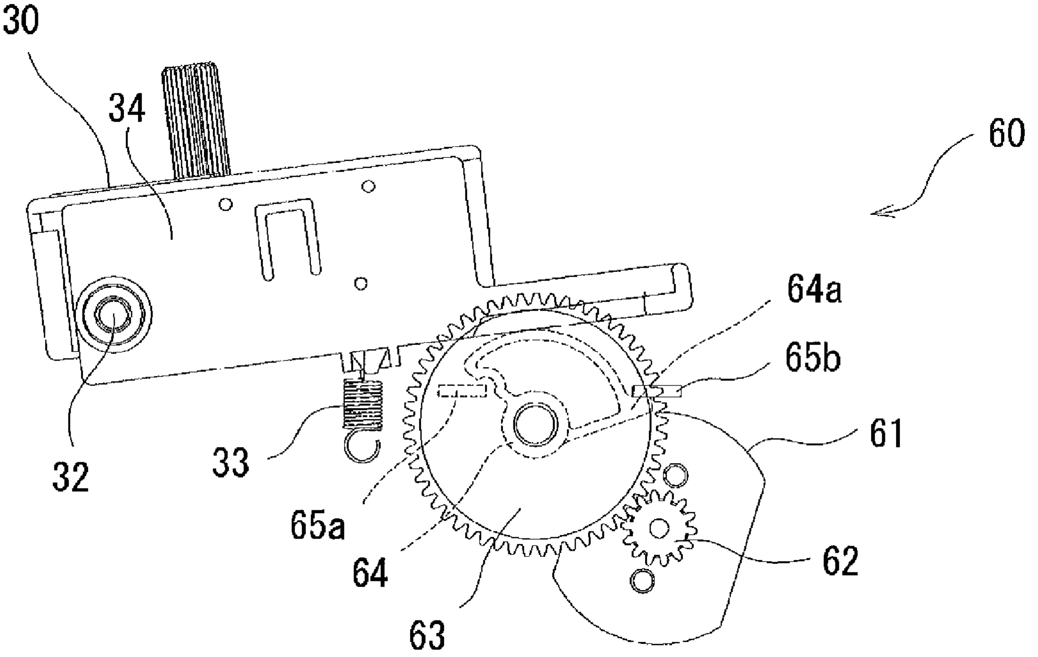

Next, a description will now be given of a swing mechanism 60 in detail. FIG. 7 is a top view showing structures of the ribbon cassette 30 and the swing mechanism 60. FIGS. 8A and 8B are a side views showing the ribbon cassette 30 and the swing mechanism 60. FIG. 8A is a side view showing the state where the ribbon cassette 30 is held in the horizontal posture. FIG. 8B is a side view showing the state where the ribbon cassette 30 is held in the inclined posture.

The swing mechanism 60 includes: a DC motor 61; a pinion gear 62 fixed to the rotatable shaft of the DC motor 61; a driven gear 63 meshing with the pinion gear 62; a cam 64 formed on a rear surface of the driven gear 63; a first stopper 65*a;* a second stopper 65*b;* and so on. The first stopper 65*a* and the second stopper 65*b* are integrally formed with a flame 11. Further, a swing member 34 which is equipped with the ribbon cassette 30 mounts on these first stopper 65*a* and second stopper 65*b*.

The ribbon cassette 30 is swingably supported, centering about a shaft portion 32 by the swing member 34. In addition, a spring 33 is attached at its one end to the swing member 34 equipped with the ribbon cassette 30, and at its other end to the flame 11 for axially supporting the swing member 34.

An engagement portion 64*a* is provided with the cam 64. The clockwise rotation of the driven gear 63 is limited by the abutment of one end of the engagement portion 64*a* with the first stopper 65*a*. Also, the counterclockwise rotation of the driven gear 63 is limited by the abutment of the other end of the engagement portion 64*a* with the second stopper 65*b*.

Also, the cam 64 has a sectorial shape, a circumferential surface thereof comes into contact with a bottom surface of the swing member 34, pushing up the ribbon cassette 30.

Also, as shown in FIG. 8B, the spring 33 biases the ribbon cassette 30 toward the cam 64 so as to eliminate the possibility of a backlash between the swing member 34 equipped with the ribbon cassette 30 and the cam 64.

Consequently, the rotation of the driven gear 63 causes the cam 64 to come into contact with the bottom surface of the swing member 34 equipped with the ribbon cassette 30, enabling the ribbon cassette 30 to swing about the shaft portion 32. Accordingly, the positional relation of the ink ribbon 31 against the print head 40 in the width direction of the ink ribbon 31 is changed, so that the color to be printed on the time card can be changed.

As mentioned above, the rotational range of the cam 64 can be limited by a simple structure, making it possible to limit the swinging range of the ribbon cassette 30. Therefore, it is possible to maintain the accuracy of changing the color to be printed by the changing positional relation between the print head 40 and the ink ribbon 31 with a simple structure.

Also, even if the rotational range of the cam 64 is roughly set, that is, the amount of rotation of the DC motor 61 is roughly set, the rotational range of the cam 64 is limited with certainty.

Thus, the swinging range of the ribbon cassette 30 can be limited with certainty, enabling the accuracy of changing the color to be printed to be maintained.

Moreover, with the simple structure, it is possible to maintain the accuracy of changing the color to be printed, so that the manufacturing cost can be reduced.

Next, a description will now be given of a swing process of the ribbon cassette 30 in detail.

Figure 9A:
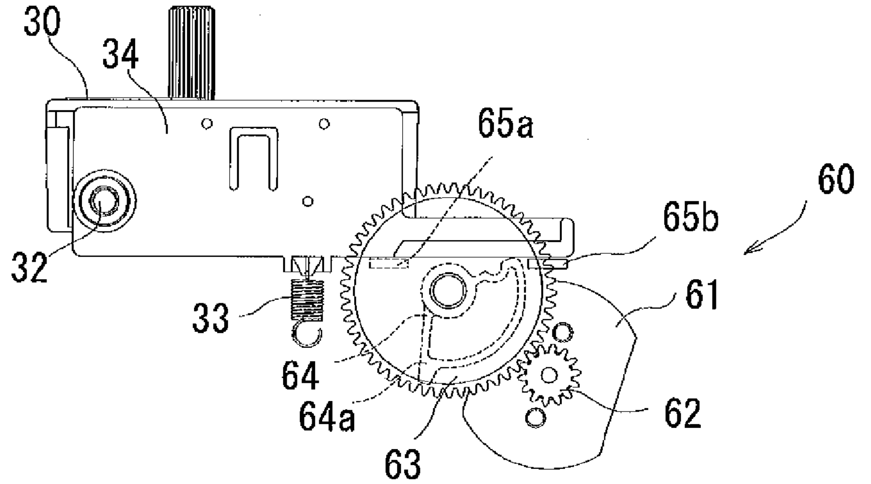
FIGS. 9A to 9C show the swing process of the ribbon cassette in detail.
Figure 9B:
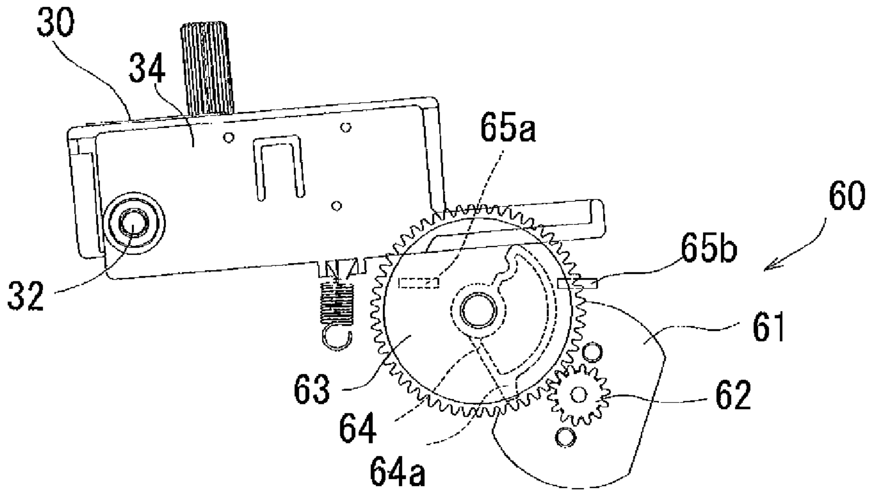
Figure 9C:
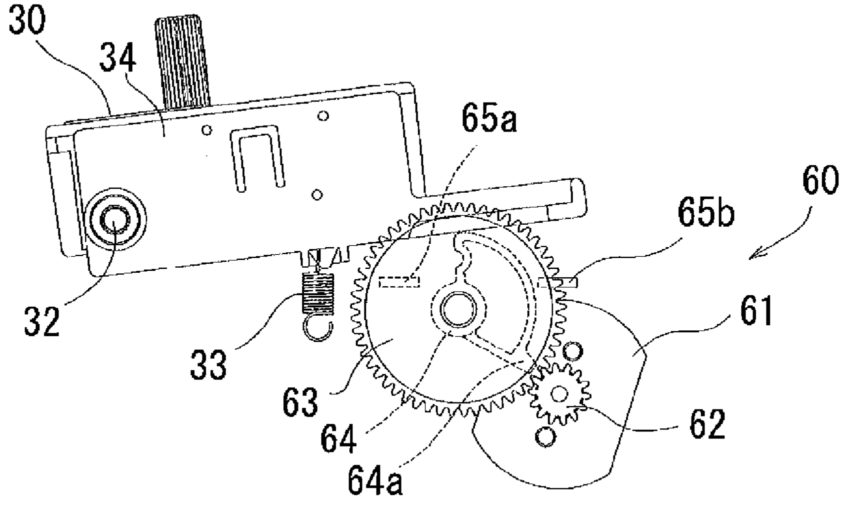

FIGS. 9A to 9C show the swing process of the ribbon cassette 30 in detail.

FIG. 9A shows the state where the cam 64 rotates in the counterclockwise direction about 60 degrees from the state shown in FIG. 8A.

In this period, the cam 64 is not contact with the swing member 34 equipped with the ribbon cassette 30. This maintains the ribbon cassette 30 horizontally.

FIG. 9B shows the state where the cam 64 further rotates in the counterclockwise direction about 45 degrees from the state shown in FIG. 9A. As mentioned above, when the cam 64 comes into contact with the bottom surface of the swing member 34, which is equipped with the ribbon cassette 30, and then pushes up the bottom surface, the ribbon cassette 30 starts swinging.

FIG. 9C shows the state where the cam 64 further rotates in the counterclockwise direction about 45 degrees from the state shown in FIG. 9B. As shown in FIG. 9C, the ribbon cassette 30 is held in the other end position of the swinging range.

Also, the cam 64 further rotates in the counterclockwise direction about 45 degrees from the state shown in FIG. 9C mentioned above, thus, bringing about the state shown in FIG.

8B. In this period, the ribbon cassette 30 is held in the other end position of the swinging range regardless of the amount of rotation of the cam 64.

Accordingly, even if the state shown in FIG. 8A is changed, by rotating the driven gear 63 in the counterclockwise direction, to the state shown in FIG. 9A, the ribbon cassette 30 is held in one end position of the swinging range. Also, even if the state shown in FIG. 9C is changed, by further rotating the driven gear 63, to the state shown in FIG. 8B, the ribbon cassette 30 is held in the other end position of the swinging range.

Consequently, the cam 64 is so shaped that the ribbon cassette 30 is held in one end position or the other end position of the swinging range, within a predetermined rotational range from the position where the rotation of the driven gear 63 is limited by the abutment of the engagement portion 64*a* with the first stopper 65*a* or the second stopper 65*b*.

Therefore, if the rotational range of the driven gear 63 is set so as to locate the driven gear 63 within the predetermined range from the limited position, the cam 64 allows the ribbon cassette 30 to be held in one end position or the other end position of the swinging range of the ribbon cassette 30. This makes it possible to maintain the accuracy of changing the color to be printed with the simple structure, even if the rotational range of the driven gear 63 is roughly set.

Next, a description will now be given of a driving of the DC motor 61.

Figure 10A:
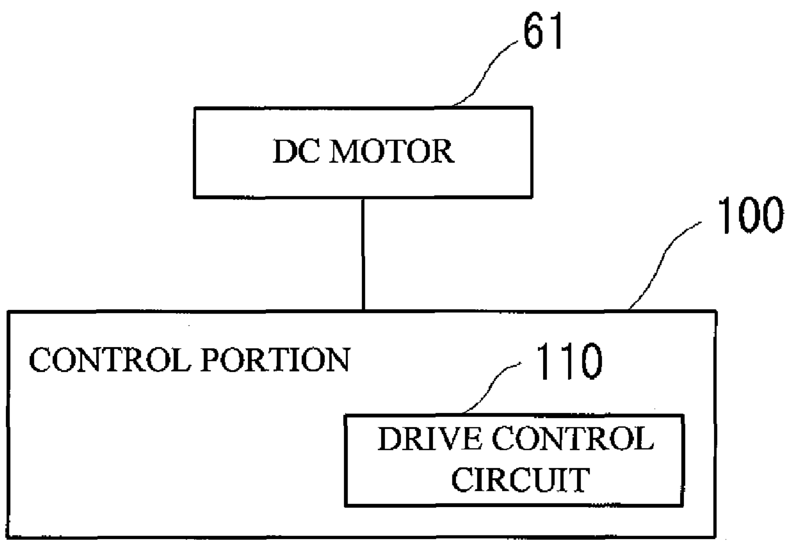
FIGS. 10A and 10B are explanation views of the DC motor and a control portion.
Figure 10B:
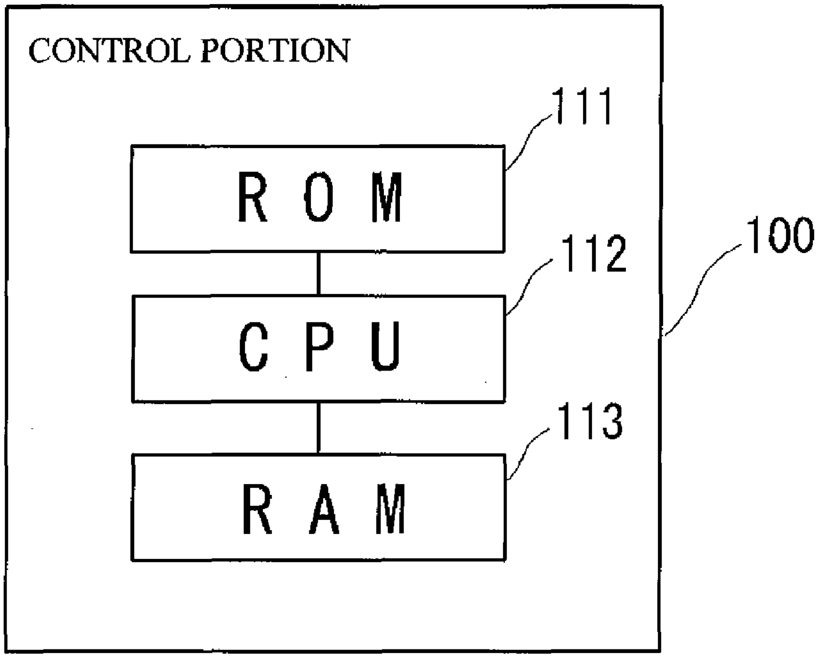

FIGS. 10A and 10B are explanation views of the DC motor and a control portion.

A control portion 100, as shown in FIG. 10A, outputs a driving signal and the like to a drive control circuit 110.

Also, the control portion 100, as shown in FIG. 10B, includes: a ROM(Read only Memory)111, a CPU(Central Processing Unit)112, a RAM(Random Access Memory)113, and the like. The control portion 100 controls the actuation of the whole operation of the time recorder 1.

Figure 11:
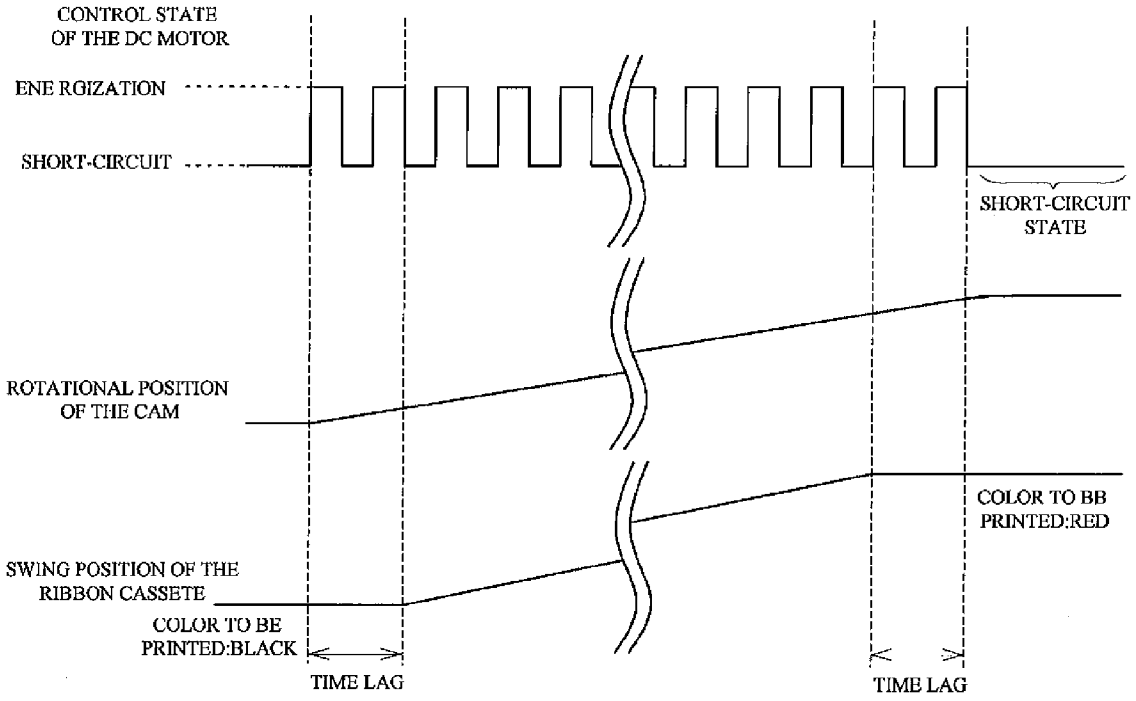
FIG. 11 is an explanatory view showing the relation among the control state of a DC motor, the rotational position of a cam, and the swing position of the ribbon cassette.

FIG. 11 is an explanatory view showing the relation among the control state of the DC motor, the rotational position of the cam, and the swing position of the ribbon cassette. Additionally, FIG. 11 shows the state when the ribbon cassette 30 is changed from the horizontal posture to the inclined posture.

Referring now to FIG. 11, the rotation of the cam 64 is in conjunction with the rotation of the DC motor 61. As described heretofore, since there is a time lag between the start of the rotation of the cam 64 and the abutment of the cam 64 with the bottom surface of the swing member 34, which is equipped with the ribbon cassette 30, the ribbon cassette 30 swings in conjunction with the rotation of the cam 64 after the cam 64 rotates a predetermined number of times.

Herein, the drive control circuit 110 controls an energized state of the DC motor 61. More specially, as shown in FIG. 11, the drive control circuit 110 drives the DC motor 61 intermittently by alternately converting the energized state and the short-circuit state so as to drive the DC motor 61.

In this manner, the intermittent driving of the DC motor 61 enables the DC motor 61 to be rotated slowly. The DC motor 61 can be rotated slowly, thereby cushioning an impact that is generated by the abutment of the cam 64 with the first stopper 65*a* or the second stopper 65*b* due to the rough setting of the rotational range of the DC motor 61.

Also, by reducing the amount of the power supplied to the DC motor 61, the DC motor 61 can be rotated slowly. However, as a result, the torque of the DC motor 61 is reduced. Specifically, if the cam 64 pushes up the bottom surface of the ribbon cassette 30 to swing the ribbon cassette 30 until a predetermined inclined angle, a predetermined torque is needed so as to rotate the cam 64 against the weight of the ribbon cassette 30 and the biasing force of the spring 33. Hence, it is undesirable to reduce the amount of the power supplied to the DC motor 61, however, the DC motor 61 is intermittently driven by changing the energized state or the short-circuit state, thereby making it possible to reduce the rotational speed and to ensure a constant torque.

Moreover, when the driving of the DC motor 61 is stopped and then the ribbon cassette 30 is located at predetermined positions, since the drive control circuit 110 permits the DC motor 61 to be in a short-circuit state during predetermined times at the time of termination of the intermittent drive, the DC motor 61 is brought into the braking state by the brakes applied to the rotation of the DC motor 61.

Thus, the application of short-circuit brakes to the DC motor 61 can cushion the impact that is generated by the abutment of the cam 64 either with the first stopper 65*a* or with the second stopper 65*b*.

Additionally, for example, when the ribbon cassette 30 is held in the inclined posture with the cam 64 abutting therewith, it is necessary to stop the cam 64 at a predetermined rotational position against the weight of the ribbon cassette 30 and the biasing force of the spring 33. In consequence, the DC motor 61 is provided in the short-circuit state to prevent the reverse rotation of the DC motor 61, enabling the cam 64 to be stopped at a predetermined rotational position.

Additionally, as to the number of times of energizing the DC motor 61 at the time when the ribbon cassette 30 is pushed up against the biasing force of the spring 33 and is swung to change the color to be printed from black to red, and as to the number of times of energizing the DC motor 61 at the time when the ribbon cassette 30 is lowered in accordance with the biasing force of the spring 33 and is swung to change in the color to be printed from red to black, the latter number is set few than the former one. For instance, the period of the energized state is set to 3 ms (millisecond) and that of the short-circuit state is set to 3 ms, alternately switching between the energized state and the short-circuit state. The number of times of energizing the DC motor is set to 30 times while the ribbon cassette 30 is swinging to change the color to be printed from black to red, the number of times of energizing the DC motor is set to 10 times while the ribbon cassette 30 is swinging to change the color to be printed from red to black, and the period of the short-circuit state for final brakes is set to 44 ms. This therefore makes it possible to cushion the impact generated by the abutment of the first stopper 65*a* or the second stopper 65*b* with the swinging member 34, equipped with the ribbon cassette 30.

Second Embodiment

Next, a time recorder in accordance with a second embodiment will now be described. Additionally, like members or components employed in the time recorder in accordance with the aforementioned first embodiment will not be described.

Figure 12:
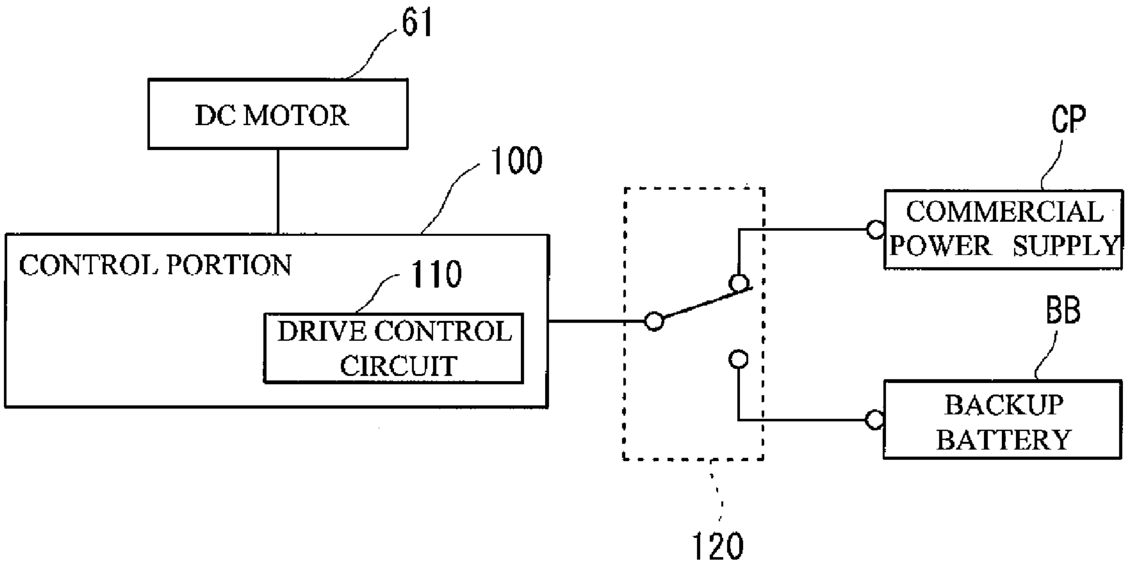
FIG. 12 is a functional block diagram showing a configuration of a time recorder in accordance with a second embodiment.

FIG. 12 is a functional block diagram showing a configuration of the time recorder in accordance with the second embodiment. The time recorder in accordance with the second embodiment includes a power switch circuit 120 and a backup battery BB. The power switch circuit 120 selects the type of power supply, which is supplied to the control portion 100 and the DC motor 61 or the like. The power switch circuit 120 typically selects the commercial power supply CP as a power supply, and switches to the backup battery BB at the time of power failure or the like. Therefore, the power supply is also available at the time of power failure.

Figure 13A:
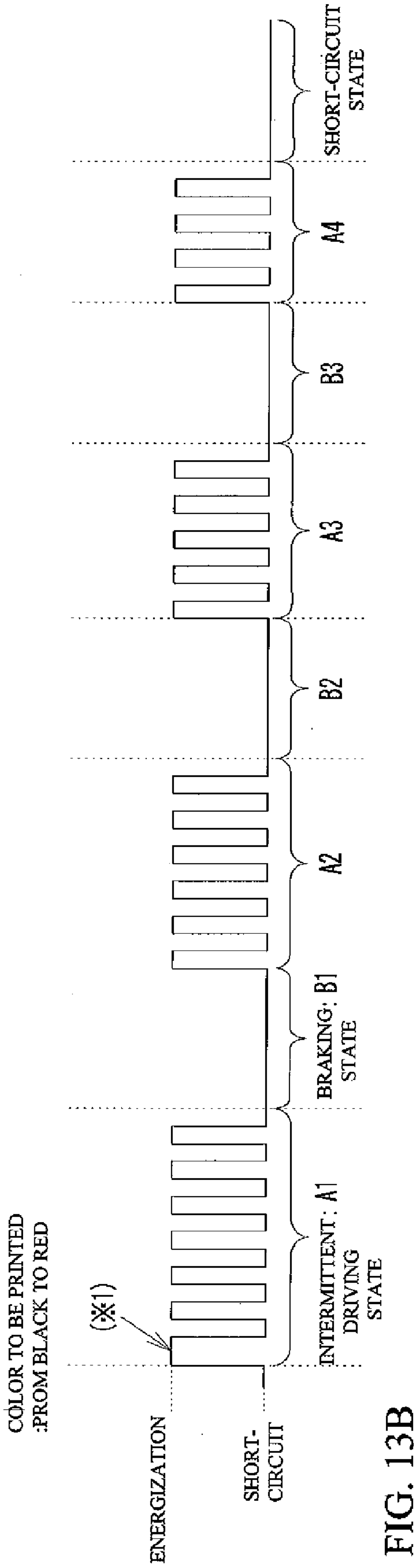
FIGS. 13A and 13B are explanation views showing a control state of a DC motor of the time recorder in accordance with the second embodiment.
Figure 13B:
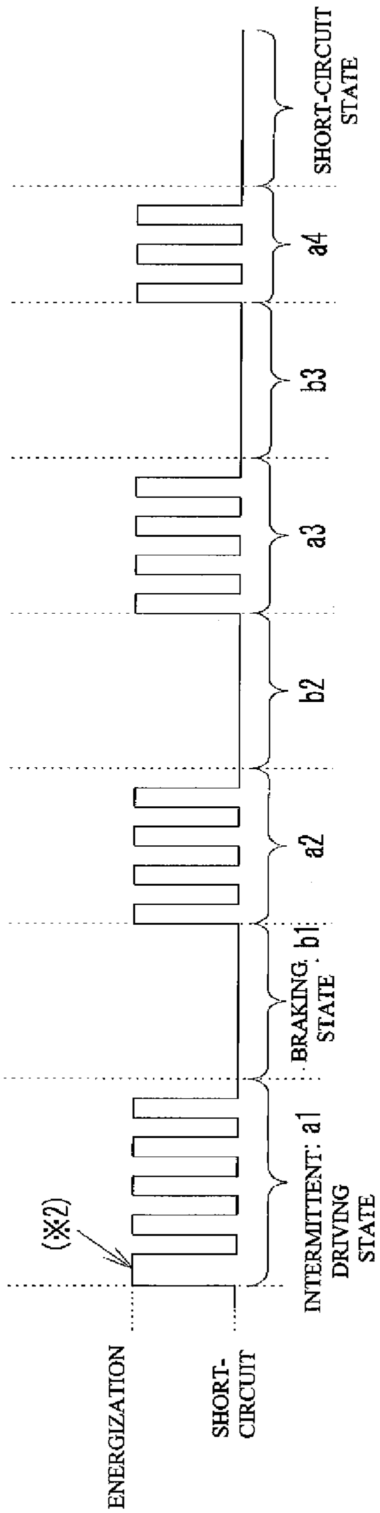

FIGS. 13A and 13B are explanation views showing a control state of the DC motor of the time recorder in accordance with the second embodiment. Additionally, FIG. 13A shows the case where the ribbon cassette 30 is shifted to the inclined posture from the horizontal posture, that is to say, where the color to be printed is changed to red from black. Also, FIG. 13B shows the case where the color to be printed is changed from red to black.

As shown in FIG. 13A, in the time recorder in accordance with a second embodiment, the DC motor 61 is alternately switched between the intermittent driving state and the braking state at every predetermined period by the driving control circuit 110. In FIG. 13A, the period of the intermittent driving state is denoted by A1, A2, A3, and A4, and the period of the braking state is denoted by B1, B2, and B3. That is to say, in the DC motor 61, the intermittent driving state and the braking state is alternately repeated, the intermittent driving state is provided by alternately switching between the energized state and the short-circuit state in a short-cycle time, and the braking state provided by causing the short-circuit state during a predetermined period to temporarily stop the rotation of the DC motor 61.

In this manner, the driving control circuit 110 permits the DC motor 61 to alternately repeat between the intermittent driving state and the braking state at every predetermined period, and the DC motor 61 to rotate to reach a final stop position. Since the intermittent driving state and the braking state is alternately repeated, even if the engagement portion 64*a* abuts with the second stopper 65*b* during the intermittent driving period and the cam 64 rotates in the reverse direction, the reverse rotation of the cam 64 is restrained by the subsequent braking state. Therefore, it is possible to restrain the reverse rotation of the cam 64, too.

Also, when the state is changed to the intermittent driving state again after the braking state, the DC motor 61 starts rotating from the position again. Therefore, even if the engagement portion 64*a* comes into contact with the second stopper 65*b* to rotate the cam 64 in the reverse direction, it is possible to finally stop the cam 64 in a suitable position.

Also, the driving control circuit 110, referring to FIG. 13A, gradually shortens the intermittent driving period from A1 to A4, and allows the DC motor 61 to stop at a final stop position. Accordingly, the intermittent driving period becomes shorter as the. engagement portion 64*a* comes close to the position in which the rotation is limited by the second stopper 65*b*. Hence, even if the engagement portion 64*a* abuts with the second stopper 65*b* during the intermittent driving period and the cam 64 rotates in the reverse direction, the DC motor 61 is changed to the braking state immediately. It is therefore possible to stop the reverse rotation of the cam 64 immediately.

It is to be noted that, in general DC motor, power supply voltage or ambient temperature changes the rotational speed thereof or the like. For this reason, for example, if the driving pulse applied to a DC motor is set at low voltages and low temperatures (hereinafter, referred to as low voltages and low temperatures), the rotational speed thereof may be so fast at high voltages and high temperatures (hereinafter, referred to as high voltages and high temperatures). Therefore, the DC motor 61 rotates too much high voltages and high temperatures, the engagement portion 64*a* abuts with the second stopper 65*b,* causing the cam 64 to bound and the DC motor 61 to reverse.

However, in the time recorder in accordance with the second embodiment, for example, as shown in FIG. 13A, even if the cam 64 abuts with the second stopper 65*b* during the intermittent driving period denoted by A3 and the cam 64 is reversely rotated, the state of the DC motor 61 is in the braking state denoted by B3 afterward. For this reason, the reverse rotation of the DC motor 61 is restrained, thereby restraining the cam 64 to bound. Subsequently, since the driving control circuit 110 further drives the DC motor 61 intermittently in A4, the cam 64 rotates to a suitable stop position to allow the ribbon cassette 30 to swing to a predetermined position through the swing member 34.

Hence, even if the driving pulse applied to the DC motor 61 is so strongly set that the color to be printed can be changed at low voltages and low temperatures, it is possible to change the color to be printed appropriately at high voltages and high temperatures. Moreover, the driving pulse is set on the basis of low voltages and low temperatures, for example, even when the power supply voltage for driving the DC motor 61 is decreased or even when it is used in a cold region, it is possible to maintain the accuracy of changing the color to be printed.

Also, the driving control circuit 110 changes the intermittent driving period of the DC motor 61 according to the rotational direction of the DC motor 61. As shown in FIG. 13B, as to the intermittent driving period of the DC motor 61 at the time when the ribbon cassette 30 is pushed up against the biasing force of the spring 33 and is swung to change the color to be printed from black to red, and as to the intermittent driving period of the DC motor 61 at the time when the ribbon cassette 30 is lowered by the biasing force of the spring 33 and is swung to change the color to be printed from red to black, the latter period is set shorter than the former one. With this configuration, it is possible to suitably control the rotation of the DC motor 61 according to the load applied thereon. Also, the period of energized state in the initial driving time(·※1, ·※2) is longer than other energized states so as to ensure the starting torque.

Moreover, the driving control circuit 110 changes the intermittent driving period according to the type of the power supply for driving the DC motor 61. Specifically, as to a case where the power supply is the commercial power supply CP and another case where the power supply is the backup battery BB, the intermittent driving period of the former case is set shorter than the latter one. The reason is that the battery voltage is generally lower the commercial power supply voltage. This makes it possible to control the amount of the rotation of the DC motor 61 in response to the amount of the rotation, fluctuating according to the power supplied, of the DC motor 61. Therefore, even if the power supply is changed, it is possible to maintain the accuracy of the changing the color to be printed.

While the preferred embodiments of the present invention have been illustrated in detail, the present invention is not limited to the above-mentioned embodiments, and other embodiments, variations and modifications may be made without departing from the scope of the present invention.

Finally, several aspects of the present invention are summarized as follows.

According to an aspect of the present invention, there is provided a time recorder including: a print head; a ribbon cassette swingably supported and having an ink ribbon applied with a different colors in a width direction; a cam for swinging the ribbon cassette to change a position of the ink ribbon against the print head in the width direction of the ink ribbon and to change a color to be printed on time card; a stopper for limiting a rotational range of the cam; a DC motor for rotating the cam; and a drive circuit for intermittently driving the DC motor by alternately switching a energized state and a short-circuit state, and for braking the DC motor by bringing the DC motor to a short-circuit state during a predetermined period, wherein the drive circuit permits the DC motor to rotate in a direction by alternately switching an intermittent driving state and a braking state.

With this arrangement, the rotational range of the cam can be limited by a simple structure, making it possible to limit the swinging range of the ribbon cassette. It is therefore possible to maintain the accuracy of changing the color to be printed by the changing positional relation between the print head and the ink ribbon with a simple structure.

Also, even if the rotational range of the cam is roughly set, the rotational range thereof is limited with certainty.

Thus, the swinging range of the ribbon cassette can be limited with certainty, enabling the accuracy of changing the color to be printed to be maintained.

Moreover, with the-simple structure, it is possible to maintain the accuracy of changing the color to be printed, so that the manufacturing cost can be reduced.

Additionally, with this arrangement, the DC motor is driven intermittently by alternately changing the energized state and the short-circuit state, it is therefore possible to rotate the DC motor slowly with a constant torque ensured.

The DC motor can be rotated slowly, it is therefore possible to cushion the impact that is generated by the abutment of the cam with the stopper due to the rough setting of the rotational range of the DC motor.

Also, the DC motor is provided in the short-circuit state to be stopped, it is possible to further cushion the impact generated by the abutment of the stopper with the cam.

In addition, with this arrangement, even if the cam abuts with the stopper during the intermittent driving period and the cam rotates in the reverse direction, the reverse rotation of the cam is restrained by the subsequent braking state.

Therefore, it is possible to restrain the reverse rotation of the cam.

Also, when the state is changed to the intermittent driving state again after the braking state, the DC motor starts rotating from the position again. Therefore, even if the cam comes into contact with the stopper to rotate the cam 64 in the reverse direction, it is possible to finally stop the cam in a suitable position.

Therefore, even if the rotational range of the cam is roughly set, it is possible to maintain the accuracy of the changing the color to be printed.

Furthermore, the cam may be so shaped that the ribbon cassette is held in one end position of the swinging range of the ribbon cassette, within a predetermined rotational range from a limited position where the cam abuts with the stopper and the rotation of the cam is limited.

With this arrangement, if the rotational range of the cam is set so as to locate the cam within the predetermined range from the limited position, the cam allows the ribbon cassette to be held in one end position of the swinging range of the ribbon cassette. This makes it possible to maintain the accuracy of changing the color to be printed with the simple structure, even if the rotational range of the cam is roughly set.

Additionally, the drive circuit may gradually shorten an intermittent driving period and may allow a rotation of the DC motor to stop.

With this arrangement, the intermittent driving period becomes shorter as the cam comes close to the position in which the rotation is limited by the stopper. Hence, even if the cam abuts with the stopper during the intermittent driving period and the cam 64 rotates in the reverse direction, the DC motor 61 is changed to the braking state immediately.

It is therefore possible to stop the reverse rotation of the cam immediately.

Furthermore, the drive circuit may change the intermittent driving period of the DC motor according to a rotational direction of the DC motor.

With this arrangement, it is possible to suitably control the rotation of the DC motor according to the load applied thereon.

Moreover, the drive circuit may change the intermittent driving period of the DC motor according to a type of a power supply for driving the DC motor.

With this arrangement, it is possible to control the amount of the rotation of the DC motor in response to the amount of the rotation, fluctuating according to the power supplied, of the DC motor. Therefore, even if the power supply is changed, it is possible to maintain the accuracy of the changing the color to be printed.

What is claimed is:

1. A time recorder comprising:
- a print head;
- a ribbon cassette swingably supported and having an ink ribbon applied with a different colors in a width direction;
- a swing member being mounted to the ribbon cassette;
- a cam for swinging the ribbon cassette from a first position to a second position, to change a position of the ink ribbon against the print head in the width direction of the ink ribbon and to change a color to be printed on a time card, wherein the cam has a sectorial shape and an engagement portion;
- a plurality of stoppers for limiting a rotational range of the cam;
- a DC motor for rotating the cam; and
- a drive circuit for intermittently driving the DC motor by alternately switching an energized state and a short-circuit state, and for braking the DC motor by bringing the DC motor to a short-circuit state during a predetermined period,
- wherein the drive circuit permits the DC motor to rotate in a direction by alternately switching an intermittent driving state and a braking state, wherein the swing member contacts at least one of the plurality of stoppers when the ribbon cassette is in the first position,
- wherein the swing member is in contact with the cam and is spaced apart from the plurality of stoppers when the ribbon cassette is in the second position,
- wherein a movement of the cam is limited by abutment of the engagement portion with at least one of the plurality of stoppers.

2. The time recorder as claimed in claim 1, wherein the cam is so shaped that the ribbon cassette is held in one end position of the swinging range of the ribbon cassette, within a predetermined rotational range from a limited position where the engagement portion of the cam abuts with at least one of the stoppers and the rotation of the cam is limited.

3. The time recorder as claimed in claim 1, wherein the drive circuit gradually shortens an intermittent driving period and allows a rotation of the DC motor to stop.

4. The time recorder as claimed in claim 1, wherein the drive circuit changes the intermittent driving period of the DC motor according to a rotational direction of the DC motor.

5. The time recorder as claimed in claim 1, wherein the drive circuit changes the intermittent driving period of the DC motor according to a type of a power supply for driving the DC motor.

* * * * *